United States Patent
Nomoto

(10) Patent No.: US 7,172,826 B2
(45) Date of Patent: Feb. 6, 2007

(54) METHOD OF OPERATING FUEL CELL AND POWER SUPPLY SYSTEM

(75) Inventor: Kazutoshi Nomoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 200 days.

(21) Appl. No.: 10/398,339

(22) PCT Filed: Jun. 27, 2002

(86) PCT No.: PCT/JP02/06486

§ 371 (c)(1),
(2), (4) Date: Apr. 25, 2003

(87) PCT Pub. No.: WO03/015203

PCT Pub. Date: Feb. 20, 2003

(65) Prior Publication Data

US 2004/0081863 A1    Apr. 29, 2004

(30) Foreign Application Priority Data

Aug. 7, 2001   (JP) .............................. 2001-239976

(51) Int. Cl.
*H01M 8/04* (2006.01)
(52) U.S. Cl. .......................................... 429/23; 429/22
(58) Field of Classification Search .................. None
See application file for complete search history.

(56) References Cited

U.S. PATENT DOCUMENTS

| | | | |
|---|---|---|---|
| 5,853,910 A | | 12/1998 | Tomioka et al. |
| 5,939,218 A | * | 8/1999 | Mizuno ........................ 429/23 |
| 2001/0028970 A1 | * | 10/2001 | Sano et al. .................... 429/22 |
| 2002/0009623 A1 | * | 1/2002 | St-Pierre et al. .............. 429/13 |
| 2004/0161649 A1 | * | 8/2004 | Wariishi et al. ............... 429/32 |

FOREIGN PATENT DOCUMENTS

| | | |
|---|---|---|
| EP | 1 132 986 A2 | 9/2001 |
| JP | 2002-175821 | 6/2002 |
| WO | WO 99/05741 | 2/1999 |

* cited by examiner

*Primary Examiner*—John S. Maples
(74) *Attorney, Agent, or Firm*—Bell, Boyd & Lloyd LLC

(57) ABSTRACT

Methods of operating a fuel cell and a power supply systems are provided. The methods and systems of the present invention are capable of suppressing condensation of moisture obstructing an air passage without the need of any complicated system configuration. The method of operating a fuel cell includes controlling a supply of air while monitoring a relative humidity of exhausted air. The step of controlling the supply of air can be performed such that the relative humidity of exhausted air becomes equal to or less than a specific humidity. The power supply system including, as a power supply, a fuel cell having an air supply unit, an air exhaust unit, and a fuel gas supply unit includes a humidity sensor provided on the air exhaust unit, and a control mechanism for controlling a supplied amount of air in the air supply unit based on the information provided from the humidity sensor.

1 Claim, 3 Drawing Sheets

METHOD OF OPERATING FUEL CELL AND POWER SUPPLY SYSTEM

CROSS REFERENCE TO RELATED APPLICATIONS

This patent application claims priority to Japanese Patent Document No. P2001-239976 filed on Aug. 7, 2001, the disclosure of which is herein incorporated by reference.

BACKGROUND OF THE INVENTION

The present invention relates to a method of operating a fuel cell so as to generate an electromotive force by chemical reaction between oxygen and a fuel gas (for example, hydrogen), and to a power supply system including the fuel cell as a power supply.

Fuel cells are adapted to generate an electromotive force from generators by chemical reaction between hydrogen representative of a fuel gas and oxygen (air) supplied thereto. In general, each fuel cell has a structure that an electrolyte film (proton conductive film) is sandwiched between gas electrodes, to generate a desired electromotive force by chemical reaction generated therein. Such fuel cells are greatly expected to be applied to electric cars or hybrid vehicles, and further, studies are now being made to improve the fuel cells suitable for use in new applications other than the above-mentioned application thereof mounted on vehicles such as cars, for example, in a portable application where the fuel cells are incorporated in portable equipment, by making use of advantages of the fuel cells in terms of ease for reduction in weight and size as compared with the existing dry cells and chargeable batteries.

In each fuel cell, moisture is generally produced at a cathode electrode by chemical reaction between oxygen and hydrogen. The moisture thus produced may be condensed into a liquid, and the liquid tends to overflow in an oxygen gas passage, to obstruct diffusion of oxygen gas, thereby inhibiting effective reaction. This leads to a problem in reducing the output of each fuel cell.

The kinds of moisture present in a fuel cell may include, in addition to the moisture produced by reaction between hydrogen and oxygen, moisture which has been contained in a humidified hydrogen side gas and has been then permeated on the cathode side through an electrolyte film together with protons, moisture originally contained in the air intake, and moisture initially present in the form of dew condensation in a flow passage. To prevent the reduction in output of the fuel cell, it is required to exhaust the above-described kinds of moisture obstructing an air passage; however, a large scale system is required to detect all of these kinds of moisture and optimally control the exhaust thereof, and therefore, a need exists to realize detection of these kinds of moisture and optimal control of the exhaust thereof by a small-sized and inexpensive system.

SUMMARY OF THE INVENTION

The present invention provides a method of operating a fuel cell. More specifically, the present invention provides a method of operating a fuel cell, which is capable of suppressing condensation of moisture obstructing an air passage without the need of a complicated system configuration, and to provide a power supply system using such a fuel cell.

In an embodiment, the present invention provides a method of operating a fuel cell generating an electromotive force from the fuel cell by supplying air and a fuel gas thereto. The method includes the steps of monitoring a relative humidity of exhausted air and controlling a supply of air. The present invention, in an embodiment, also provides a power supply system including, as a power supply, a fuel cell having an air supply unit, an air exhaust unit, and a fuel gas supply unit. The power supply system includes a humidity sensor provided on the air exhaust unit, and a control mechanism for controlling a supplied amount of air in the air supply unit on the basis of information given from the humidity sensor.

In a fuel cell, moisture may be internally produced due to various causes, with the amount thereof varying depending on the conditions of the fuel cell. Further, along with the change in temperature in a fuel cell depending on the environment and/or the operational condition thereof, the saturated water vapor pressure may be significantly varied. According to an embodiment of the present invention, the condensation state of the water vapor in the fuel cell can be estimated by monitoring a relative humidity at the temperature of the fuel cell. In an embodiment, the temperature of exhaust air and the relative humidity of exhausted air in a fuel cell correspond to the temperature and the humidity in the fuel cell, respectively. In this regard, the time point at which condensation of moisture in the fuel cell begins can be estimated by monitoring the temperature of exhaust air and the relative humidity of exhausted air in the fuel cell, and thus, condensation of moisture can be suppressed by adjusting supply of air based on the monitored result such that the humidity of the exhausted air is maintained at a specific humidity or less for effective operation of the fuel cell.

To this end, in an embodiment, the present invention provides a method of operating a fuel cell generating an electromotive force from the fuel cell by supplying air and a fuel gas thereto. The method includes the steps of monitoring a relative humidity of exhausted air, and controlling a supply of air.

In an embodiment, the step of controlling the supply of air is performed such that the relative humidity of exhausted air is maintained at a humidity level effective for operation of the fuel cell.

In an embodiment, the step of controlling the supply of air is performed such that the supply of air is increased to an amount effective to decrease the relative humidity of exhaust air thereby allowing effective operation of the fuel cell.

In an embodiment, the method of operating the fuel cell includes humidifying the fuel gas and supplying the humidified fuel gas to the fuel cell.

In an embodiment, the present invention provides a method wherein the fuel gas includes hydrogen.

In a further embodiment, the present invention provides a power supply system having an air supply unit, an air exhaust unit, and a fuel gas supply unit wherein the power supply system includes a fuel cell as a power supply. The power supply system includes a humidity sensor provided on the air exhaust unit, and a control mechanism for controlling a supplied amount of air in the air supply unit based on information generated from the humidity sensor.

In an embodiment, the air supply unit includes a pump for supplying air.

In an embodiment, the fuel gas comprises hydrogen.

In an embodiment, the power supply system further includes a current detecting unit for detecting an output current of the fuel cell wherein a control voltage applied to the pump is outputted from the control mechanism based on an output current value detected by the current detecting unit.

In an embodiment, the power supply system further includes a humidifier for humidifying a fuel gas to be supplied to the fuel cell and controlling the humidified amount of the fuel gas wherein the humidifier is provided on the fuel gas supply unit.

Additional features and advantages of the present invention are described in, and will be apparent from the following Detailed Description of the Invention and the figures.

DETAILED DESCRIPTION OF THE INVENTION

The present invention generally relates to fuel cells. More particularly, the present invention relates to methods of operating fuel cells and power supply systems that include fuel cells to supply power.

Figure 1:
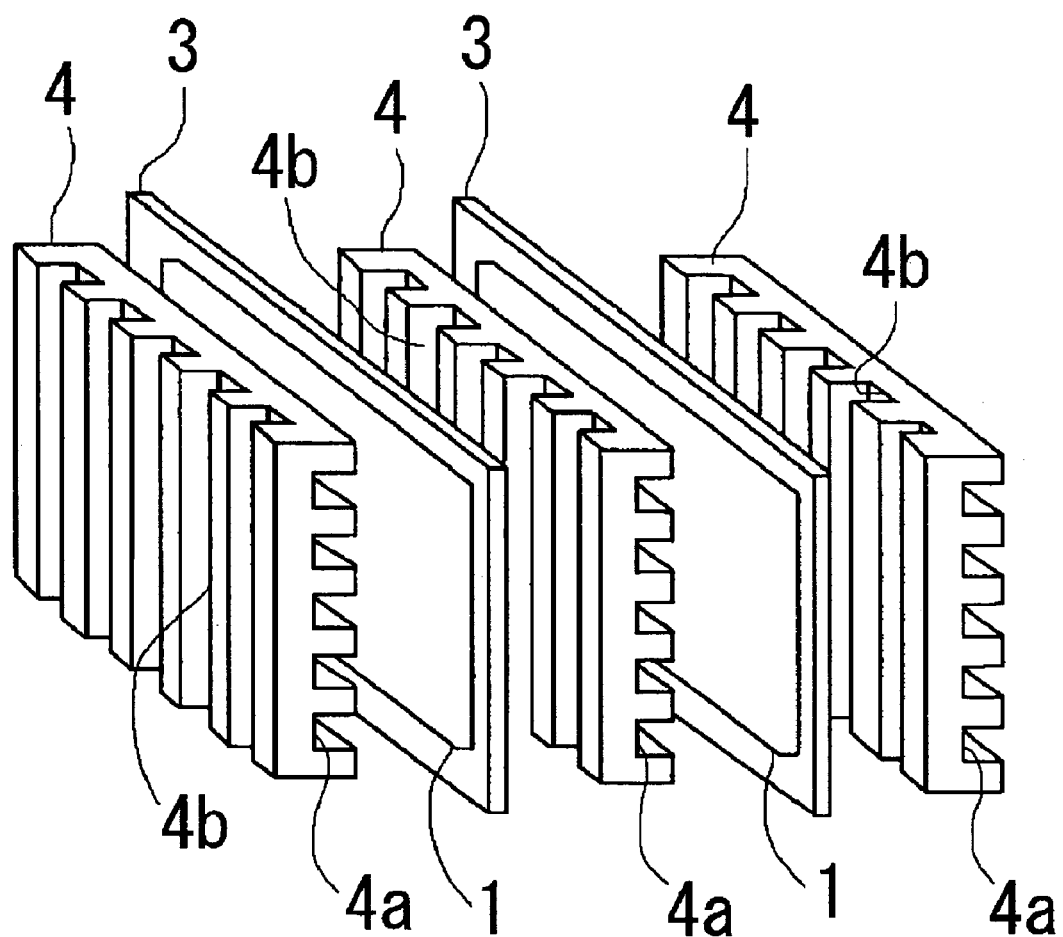
FIG. 1 is an exploded perspective view showing an example of a fuel cell according to an embodiment of the present invention.

A basic configuration of a fuel cell as a basic unit of a fuel cell and an electromotive force generating mechanism will be first described. FIG. 1 shows one configuration example of a fuel cell. As shown in FIG. 1, the fuel cell, in an embodiment, is configured by superimposing a fuel electrode 1 to an air electrode 2 via an electrolyte 3, to form a sub-assembly, and sandwiching the sub-assembly between two current collectors 4. It is to be noted that hydrogen representative of a fuel gas is in contact with the fuel electrode 1, and air (oxygen) is in contact with the air electrode 2. The current collector 4 is made from a material having a high current collecting performance and a high stability even in an oxidizing water vapor atmosphere. A preferred material of the current collector 4 is dense graphite. The surface, facing to the fuel electrode 1, of the current collector 4 has grooves 4a extending in the horizontal direction, through which hydrogen is to be supplied, and the surface, facing to the air electrode 2, of the current collector 4 has grooves 4b extending in the vertical direction, through which air is to be supplied.

Figure 2:
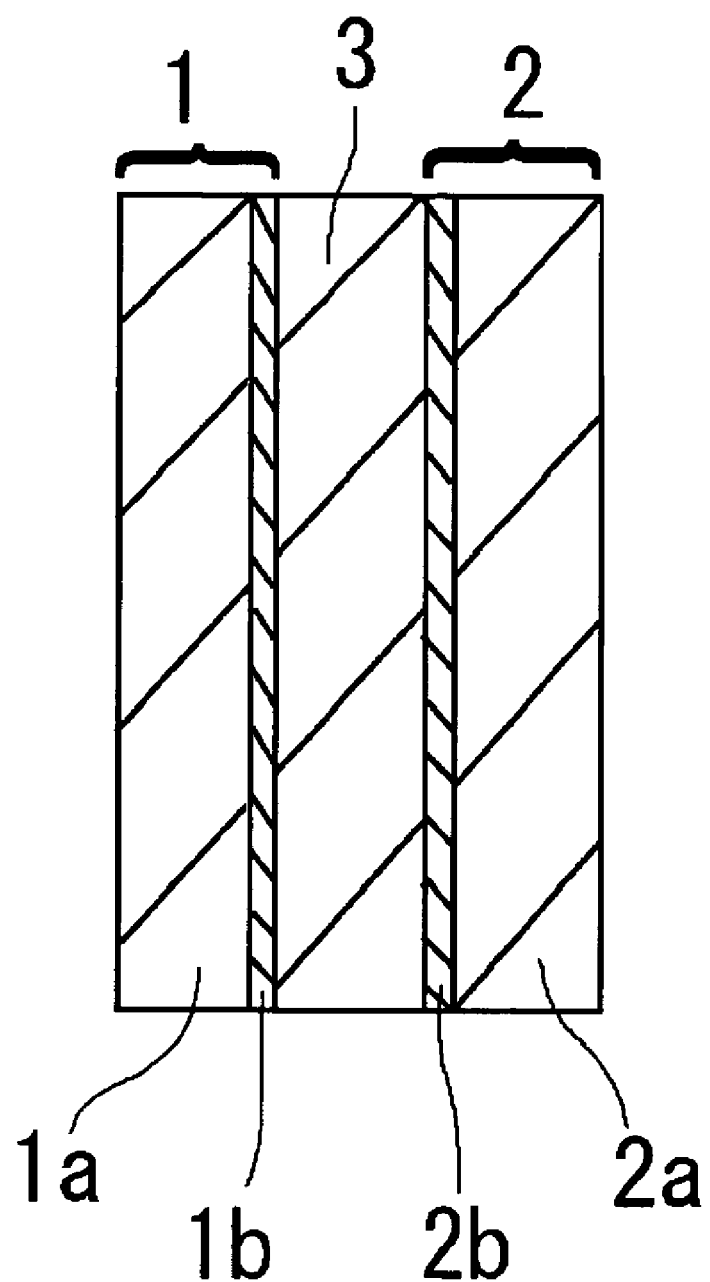
FIG. 2 is a schematic sectional view showing an example of electrodes contained in the fuel cell according to an embodiment of the present invention.

As shown in FIG. 2, the fuel electrode 1 and the air electrode 2, in an embodiment, are arranged with the electrolyte 3 sandwiched therebetween. The fuel electrode 1 is composed of a gas diffusion electrode 1a and a catalyst layer 1b, and the air electrode 2 is composed of a gas diffusion electrode 2a and a catalyst layer 2b. Each of the gas diffusion electrodes 1a and 2a is made from a porous material, and each of the catalyst layers 2a and 2b is made from a mixture of an electrolyte and carbon particles in which an electrode catalyst such as platinum is supported.

A plurality of the above-described fuel cells are stacked as basic units to each other, to form a fuel cell. These fuel cells are connected in series, to output a specific voltage.

In the fuel cell having the above-described configuration, when hydrogen gas flows in the grooves 4a formed in the current collector 4 so as to be in contact with the fuel electrode 1, and air (oxygen) flows in the grooves 4b formed in the current collector 4 so as to be in contact with the air electrode 2, reaction occurs on each of the fuel electrode 1 side and the air electrode 2 side.

The reaction on the fuel electrode 1 side is expressed by the following reaction formula:

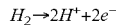

$$H_2 \rightarrow 2H^+ + 2e^-$$

The reaction on the air electrode 2 side is expressed by the following reaction formula:

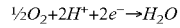

$$\tfrac{1}{2}O_2 + 2H^+ + 2e^- \rightarrow H_2O$$

The reaction in the whole fuel cell is expressed by the following reaction formula:

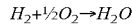

$$H_2 + \tfrac{1}{2}O_2 \rightarrow H_2O$$

As shown in the above reaction formulas, hydrogen is converted into protons by release of electrons therefrom at the fuel electrode 1, and the protons are migrated to the air electrode 2 side through the electrolyte 3, to react with electrons and oxygen at the air electrode 2. As a result of such electrochemical reaction, an electromotive force is generated.

Figure 3:
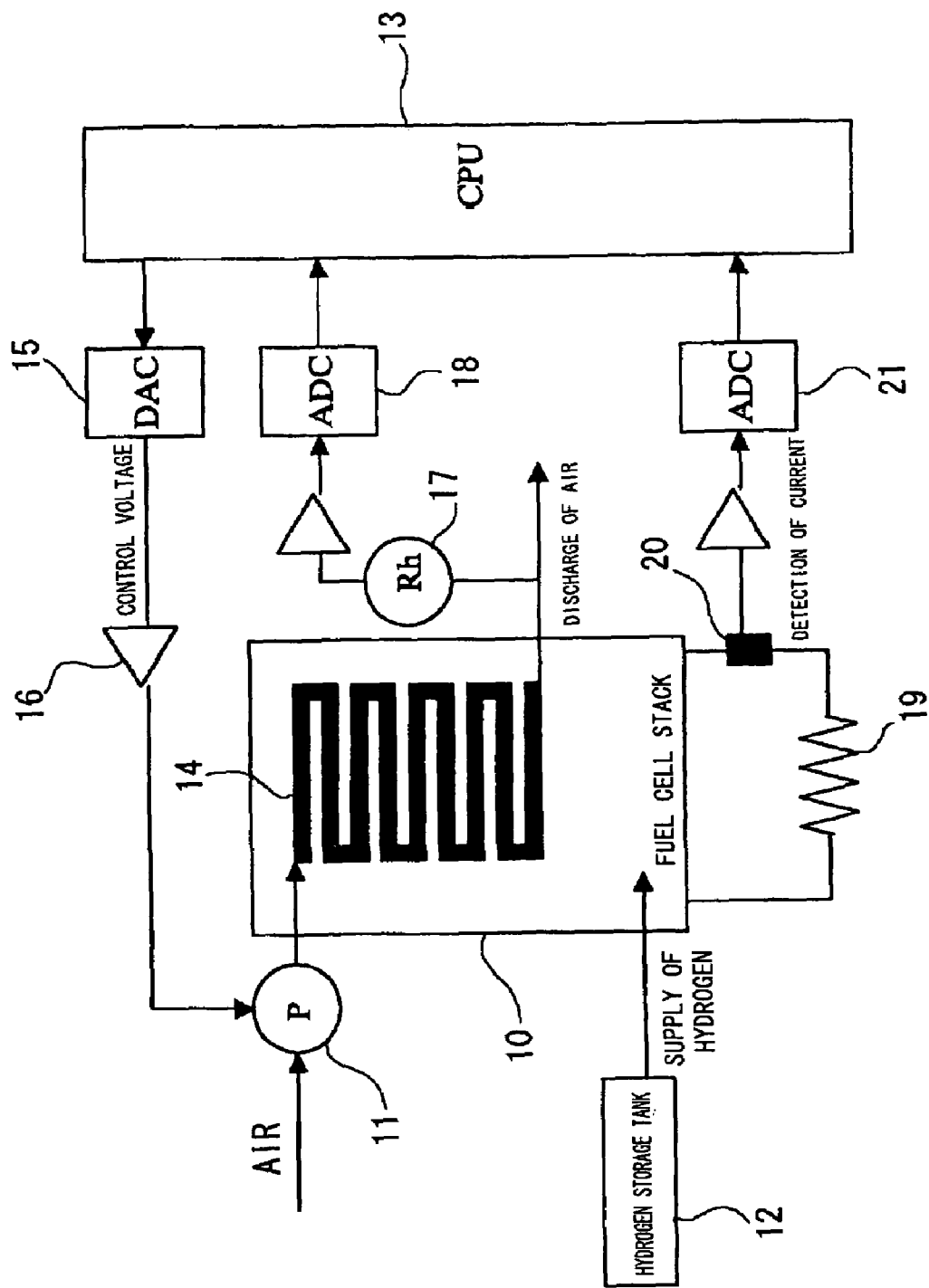
FIG. 3 is a schematic diagram showing an example of a fuel cell operating system according to an embodiment of the present invention.

FIG. 3 shows one example of a system of operating the fuel cell composed of the fuel cells each having the above-described configuration according to an embodiment of the present invention. As shown in the figure, air is supplied from an air supply unit exemplified by an air pump 11 to the air electrodes of the fuel cells 10, and hydrogen representative of a fuel gas is supplied from a fuel supply unit exemplified by a hydrogen storage tank 12 to the fuel electrodes of the fuel cells 10.

The above-described fuel cell operating system includes a CPU 13 as a control mechanism for executing various kinds of control. For example, the air pump 11 for supplying air, which is provided for compressing air and supplying the compressed air to an air passage 14 in order to supply oxygen required for reaction at the cathode electrodes (fuel electrodes), is controlled by the CPU 13. That is to say, the control voltage applied to the air pump 11 is controlled by the CPU 13. More specifically, the control voltage is outputted from the CPU 13 via a D/A converter 15. The control voltage is then applied to a drive amplifier 16 of the air pump 11, to control an amount of air to be supplied by the air pump 11.

Further, a humidity sensor 17 for monitoring a relative humidity of exhausted air is provided on an air exhaust unit connected to the end of the air passage 14. The air having been used for reaction is exhausted from the air exhaust unit. The output voltage of the humidity sensor 17 is subjected to A/D conversion via an A/D converter 18, and the converted output voltage is inputted in the CPU 13. A current detecting unit 20 for detecting an output current flowing in a load 19 is provided for the fuel cell 10, and the detected current value is subjected to A/D conversion by an A/D converter 21 and the converted current value is then inputted in the CPU 13.

The fuel cell operating system having the above-described configuration according to an embodiment of the present invention provides an improved and unique system without the need of any complicated system configuration, that is, a simple, small-sized, and inexpensive system that is capable of effectively detecting the state of moisture produced in the fuel cell and controlling exhaust of the produced moisture. As described above, in each fuel cell, moisture is generally produced at a cathode electrode by chemical reaction between oxygen and hydrogen. The moisture may be condensed into a liquid, and the liquid tends to overflow in an oxygen gas passage, to obstruct diffusion of oxygen gas, thereby inhibiting effective reaction. This leads to a problem in reducing the output of each fuel cell. To address such a problem, the system according to an embodiment of the present invention is capable of vaporizing the moisture and exhausting the vaporized moisture to the outside of the fuel cell as described in detail below.

First, to supply an oxygen amount proportional to an output current to the fuel cell 10, it is required to supply at least a flow rate of air, which corresponds to the above oxygen amount, to the fuel cell 10. For this purpose, an output current value I flowing in the load 19 is detected by the current detecting unit 20, being subjected to A/D conversion by the A/D converter 21, and is inputted in the CPU 13. The CPU 13 generates a control voltage $V_0$ (expressed by the following equation) for allowing the flow of air corresponding to the output current.

$V_0 = K_1 \times I$ ($K_1$: specific coefficient)

The above-described flow of air produced by the air pump 11 is used for vaporizing and discharging the moisture obstructing an air passage. Examples of various types of moisture present in the fuel cell may include moisture produced by reaction between hydrogen and oxygen, moisture which has been contained in a humidified hydrogen side gas and has been then permeated on the cathode side through an electrolyte film together with protons, moisture originally contained in sucked air, and moisture initially present in the form of dew condensation in a flow passage. To detect all of these types of moisture and optimally control the exhaust thereof, a large scale system would be required as generally recognized in the art. In other words, it is generally recognized to be difficult to detect all of these kinds of moisture and thus achieve optimal control of the exhaust thereof by a small-sized and inexpensive system.

According to an embodiment of the present invention, however, these types of moisture can be readily detected as a whole and thus optimal control of exhaust thereof can be achieved. This can be achieved by monitoring a relative humidity of exhausted air and estimating the total amount of the moisture in the fuel cell based on the monitored result according to an embodiment of the present invention.

In this regard, when air flows in the fuel cell in a gas-liquid phase equilibrium state, moisture is vaporized until the vaporized amount of moisture reaches a saturated water vapor amount that results in an increase in the relative humidity of exhausted air. On the other hand, when the amount of moisture in the fuel cell is small, the amount of water vapor is nearly equal to an amount of sucked water vapor. In the fuel cell, as described above, moisture may occur due to various causes, the amounts thereof varying depending on the conditions of the fuel cell. Also, along with the change in temperature in a fuel cell depending on the environment and/or the operational condition thereof, the saturated water vapor pressure may be significantly varied. In any event, the condensation state of the water vapor in the fuel cell can be estimated by monitoring a relative humidity at the temperature of the fuel cell.

Since the temperature of exhausted air and the relative humidity of exhausted air at an air exhaust port of the fuel cell desirably correspond to the temperature and the humidity in the fuel cell respectively, the moisture state in the fuel cell can be estimated by monitoring the temperature of exhausted air and the relative humidity of exhausted air. For example, when the relative humidity of exhaust air becomes close to 100%, it can be understood that condensation of moisture begins in the fuel cell. In this way, the time point at which condensation of moisture in the fuel cell begins can be checked by monitoring an exhausted air relative humidity (Rh), and therefore, condensation of moisture can be suppressed by adjusting a supply of air by the air pump 11 so as to keep the humidity of the exhausted air to a specified humidity level or less in order to provide effective operation of the fuel cell.

In practice, a control voltage (V) (expressed by the following equation), which is proportional to the supply of air and is to applied to the air pump 11, is calculated by the CPU 13 so as to be associated with the exhausted air relative humidity (Rh) detected by the humidity sensor 17.

$V = K_2 \times Rh + V_0$ ($K_2$: specific coefficient)

Accordingly, when the exhausted air relative humidity (Rh) is increased, the control voltage (V), which is adjusted so as to increase the supply of air, is supplied to the drive amplifier 16, to thereby maintain the exhaust air relative humidity at a constant and desired value.

At a low temperature, for example, at 10° C. or less, since evaporation of moisture is inactive because of a low saturated water vapor pressure, the effect of evaporating the moisture is low even by increasing the supply of air; however, in an ordinary operational temperature range, such as from about 50° C. to about 80° C., the control of the supply of air can have a significant effect on the moisture level in the fuel cell, thereby making it possible to effectively prevent an air passage from being blocked with moisture and hence to realize safe and effective operation of the system while avoiding the reduction in output.

It should be appreciated that the present invention is not limited to the above-described embodiment. For example, the present invention in an embodiment is applicable to a system of a type in which a humidifier is provided on the hydrogen supply side to humidify hydrogen and control the humidified amount of hydrogen.

As is apparent from the above description, according to an embodiment of the present invention, it is possible to suppress condensation of moisture obstructing an air passage without the need of any complicated system configuration, that is, only with a minimal sensor and a simple system configuration, and hence to realize a small-sized fuel cell operating system and a small-sized power supply system that can operate effectively at reduced costs. Further, by using such a fuel cell operating system, the power supply unit can be safely operated without reduction in output thereof, according to an embodiment of the present invention.

The invention claimed is:

1. A power supply system having an air supply unit, an air exhaust unit, and a fuel gas supply unit wherein the power supply system includes a fuel cell as a power supply, the power supply system consisting essentially of:
    a humidity sensor provided on the air exhaust unit;
    a current detecting unit for detecting an output current of the fuel cell; and
    a control mechanism for controlling a supplied amount of air in the air supply unit based on information generated from the humidity sensor and based on an output current value detected by the current detecting unit, wherein the air supply unit includes a pump for supplying air, and wherein a control voltage applied to the pump is outputted from the control mechanism based on the information generated from the humidity sensor and based on the output current value detected by the current detecting unit.

* * * * *